United States Patent Office 3,652,735
Patented Mar. 28, 1972

3,652,735
QUATERNARY PHOSPHONIUM DIALKYL PHOSPHATES
Ingenuin Hechenbleikner and Kenneth R. Molt, Cincinnati, Ohio, assignors to Carlisle Chemical Works, Inc., Reading, Ohio
No Drawing. Filed May 1, 1969, Ser. No. 821,136
Int. Cl. A01n 9/36; C07f 9/54
U.S. Cl. 260—926       2 Claims

ABSTRACT OF THE DISCLOSURE

Compound of the formula

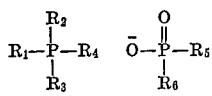

are prepared by reacting a tertiary phosphine of the formula

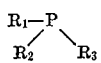

with a phosphate, primary phosphonate or secondary phosphonate of the formula

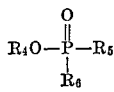

where $R_1$, $R_2$ and $R_3$ are alkyl, haloalkyl, alkenyl, aralkyl, aryl or haloaryl, $R_4$ is methyl or ethyl and $R_5$ and $R_6$ are the same or different and are $OR_7$ and $R_8$ where $R_7$ and $R_8$ are alkyl, haloalkyl, alkenyl, aralkyl, aryl or haloaryl. The compounds are useful as flame proofing agents, wetting agents, fungicides and bactericides.

---

The present invention relates to the preparation of phosphonium compounds.

Phosphonium compounds are prepared having the formula

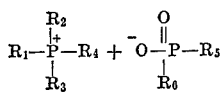

by reacting a tertiary phosphone having the formula

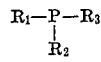

with a phosphate, primary phosphonate or secondary phosphonate of the formula

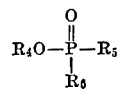

where $R_1$, $R_2$, $R_3$ are the same or different and are alkyl, haloalkyl, alkenyl, aralkyl, aryl or haloaryl, $R_4$ is methyl or ethyl and $R_5$ and $R_6$ are the same or different and are $OR_7$ or $R_8$ where $R_7$ and $R_8$ alkyl, haloalkyl, alkenyl, aralkyl, aryl or haloaryl. If at least one of $R_5$ and $R_6$ is $R_8$ the compound is a phosphonate.

The reaction is carried out at a temperature from room temperature (about 20° C.) to the boiling point. Preferably the temperature is at least 50° C.

To increase the speed of the reaction it is preferably carried out in a polar solvent such as carboxylic acids, e.g. acetic acid, propionic acid, butyric acid, isobutyric acid, valeric acid, trimethylacetic acid, caproic acid and dichloroacetic acid, water, alcohols such as methyl alcohol, ethyl alcohol, propyl alcohol, isopropyl alcohol, butyl alcohol, sec. butyl alcohol, isobutyl alcohol, t-butyl alcohol, n-amyl alcohol, isoamyl alcohol, n-hexyl alcohol, cyclohexanol, n-octyl alcohol, 2-ethylhexanol, octanol-2, decyl alcohol and isodecyl alcohol, dimethyl sulfoxide, dimethylacetamide and dimethyl formamide.

The reaction can be carried out with the reactants in the mole ratio of 1:1 or with either one in excess, e.g. a mole ratio of 2:1 or 1:2. Preferably the phosphate, phosphonate or phosphinate is in excess.

As starting phosphines there can be employed trimethyl phosphine, triethyl phosphine, tripropyl phosphine, tributyl phosphine, trioctyl phosphine, tri(2-ethylhexyl) phosphine, triisobutyl phosphine, tridecyl phosphine, trilauryl phosphine, trioctadecyl phosphine, dimethyl ethyl phosphine, dimethyl benzyl phosphine, dimethyl phenyl phosphine, dimethyl p-tolyl phosphine, dimethyl 4-bromophenyl phosphine, dimethyl 2,5-dimethylphenyl phosphine, diethyl methyl phosphine, diethyl propyl phosphine, diethyl benzyl phosphine, diethyl phenyl phosphine, diethyl o-tolylphosphine, diethyl 4-ethylphenyl phosphine, dipropyl phenyl phosphine, diallyl phenyl phosphine, diallyl 4-bromophenyl phosphine, dimethallyl phenyl phosphine, diamylphenyl phosphine diisoamyl phenyl phosphine, dibenzyl phenyl phosphine, diphenyl methyl phosphine, diphenyl p-tolyl phosphine di(p-tolyl) methyl phosphine, ethyl isopropyl isobutyl phosphine, ethyl phenyl benzyl phosphine, tri(chloromethyl) phosphine, triphenyl phosphine, tri(2-chlorophenyl) phosphine, tri (3 - chlorophenyl) phosphine, tri(4 - chlorophenyl) phosphine, tri(2 - methylphenyl) phosphine, tri(4 - methylphenyl) phosphine, tri(2,4-dimethylphenyl) phosphine, tri(1-naphthyl) phosphine, tri(4-butylphenyl) phosphine, trivinyl phosphine, triallyl phosphine, divinyl phenyl phosphine, dimethallyl phenyl phosphine, tribenzyl phosphine, dibenzyl butyl phosphine.

As starting phosphate primary phosphonate and secondary phosphonates there can be used phosphates such as trimethyl phosphate, triethyl phosphate, methyl diethyl phosphate, dimethyl propyl phosphate, methyl dipropyl phosphate, ethyl dipropyl phosphate, diethyl propyl phosphate, diethyl butyl phosphate, ethyl dibutyl phosphate, dimethylallyl ethyl phosphate, diethyl benzyl phosphate, dimethyl benzyl phosphate, methyl dibenzyl phosphate, dimethyl phenyl phosphate, methyl diphenyl phosphate, dimethyl octyl phosphate, dimethyl isodecyl phosphate, dimethyl cyclohexyl phosphate, diethyl 2-fluoroethyl phosphate, dimethyl 2-chloroethyl phosphate, diethyl 2-chloroalkyl phosphate, dimethyl 2-bromoethyl phosphate, diethyl phenyl phosphate, ethyl propyl phenyl phosphate, ethyl diphenyl phosphate, dimethyl decyl phosphate, didecyl methyl phosphate, dimethyl octadecyl phosphate, methyl di(o-tolyl) phosphate, methyl di(p-tolyl) phosphate, 1-naphthyl diethyl phosphate, 2-naphthyl diethyl phosphate, diethyl 2-chlorophenyl phosphate, dimethyl 4-chlorophenyl phosphate, dimethyl 3-bromophenyl phosphate, dimethyl vinyl phosphate, diethyl vinyl phosphate, methyl divinyl phospate, dimetyl crotyl phosphate, diethyl methallyl phosphate, dimethyl methallyl phosphate, diethyl allyl phosphate, methyl diallyl phosphate, primary phosphonic acid esters, including dimethyl methane phosphonate, dimethyl 2-propene phosphonate (dimethyl allyl phosphonate), diethyl chloromethyl phosphate, diethyl 2-methylpropene phosphonate, diethyl methane phosphonate, ethyl phenyl methane phosphonate, diethyl ethane phosphonate, dimethyl ethane phosphonate, ethyl 2-bromoethyl ethane phosphonate, diethyl ethene phosphonate, dimethyl ethene phosphonate, dimethyl 1-methyl ethene phosphonate, diethyl 1-methylethene phosphonate, diethyl 1-propene phosphonate, diethyl 2-methyl-1-propene phosphonate, diethyl 1-butene phosphonate, methyl ethyl 2-propene phosphonate, diethyl allyl phosphonate, diethyl 2-methyl-2-propenephosphonate, diethyl 2-butene phosphonate, diethyl propane phosphonate, diethyl butane phosphonate, dimethyl butane phosphonate, diethyl hexane phosphonate, dimetyl hexane phosphonate, diethyl octane phosphonate, diethyl decane phosphonate, diethyl octadecane phosphonate, dimethyl octadecane phosphonate, dimethyl phenylmethane phosphonate, ethyl 2-chloroethyl phenylmethane phosphonate, diethyl 4-methylbenzene phosphonate, dimethyl 2-methylbenzene phosphonate, dimethyl benzene phosphonate, diethyl 2-methyl-5-isopropyl benzene phosphonate, dimethyl cyclohexane phosphonate, diethyl cyclohexane phosphonate, diethyl iodomethane phosphonate, diethyl trichloromethane phosphonate, dimetyl 2-chloroethane phosphonate, dietyl 2-chloroethane phosphonate, diethyl 2-bromoethane phosphonate, diethyl 1,2-dibromoethane phosphonate, diethyl 3-bromopropane phosphonate, diethyl 1-chloro-3-methyl butane phosphonate, diethyl benzene phosphonate, diethyl 4-chlorobenzene phosphonate, diethyl 2-bromobenzene phosphonate, diethyl 2,5-dichlorobenzene phosphonate, secondary phosphonic acid esters including methyl dimethyl phosphonate, ethyl dimethyl phosphonate

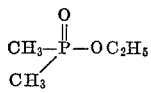

methyl diethyl phosphonate, methyl dipropyl phosphonate, methyl ethyl methyl phosphonate, methyl dibenzyl phosphonate, methyl phenyl methyl phosphonate, ethyl phenyl methyl phosphonate

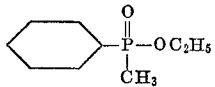

ethyl phenyl ethyl phosphonate, methyl trichloroethyl phenyl phosphonate, ethyl diphenyl phosphonate, ethyl di(4-methylphenyl) phosphonate.

Examples of compounds which can be made by the present invention include phosphate derivatives such as methyltributylphosphonium dimethyl phosphate, methyltrioctylphosphonium dimethyl phosphate, methyltriphenylphosphonium dimethyl phosphate, ethyl butyl dibenzyl phosphonium diethyl phosphate, tetramethyl phosphonium dimethyl phosphate, tetraethyl phosphonium diethyl phosphate, triethyl methyl phosphonium dimethyl phosphate, methyltributylphosphonium methyl ethyl phosphate, ethyltributyl phosphonium diethyl phosphate, ethyl trioctylphosphonium diethyl phosphate, methyl triisobutylphosphonium dimethyl phosphate, methyl trilauryl phosphonium dimethyl phosphate, methyl trioctadecyl phosphonium dimethyl phosphate, ethyl trioctadecyl phosphonium diethyl phosphate, dimethyl diethyl phosphonium dimethyl phosphate, trimethyl benzyl phosphonium dimethyl phosphate, dimethyl ethyl phenyl phosphonium diethyl phosphate, trimethyl p-tolyphosphonium dimethyl posphate, trimethyl 4 - bromophenyl phosphonium dimethyl phosphate, triethyl-2-chlorophenyl phosphonium diethyl phosphate, trimethyl 2,5 - dimethylphenyl phosphonium dimethyl phosphate, diethyl methyl propyl phosphonium dimethyl phosphate, triethyl propyl phosphonium diethyl phosphate, triethyl benzyl phosphonium diethyl phosphate, triethyl phenyl phosphonium diethyl phospate, diethyl methyl phenyl phosphonium dimethyl phosphate, triethyl o-tolyl phosphonium diethyl phosphate, triethyl 4-ethylphenyl phosphonium diethyl phosphate, dipropyl methyl phenyl phosphonium dimethyl phosphate, diallyl phenyl methyl phosphonium dimethyl phosphate, diallyl methyl 4-bromophenyl phosphonium dimethyl phosphate, dimethallyl phenyl ethyl phosphoniu diethyl phosphate, diamyl phenyl methyl phosphonium dimethyl phosphate, dibenzyl phenyl methyl phosphonium dimethyl phosphate, diphenyl dimethyl phosphonium dimethyl phosphate, diphenyl methyl ethyl phosphonium dimethyl phosphate, methyl ethyl isopropyl isobutyl phosphonium dimethyl phosphate, methyl tri(chloromethyl) phosphonium dimethyl phosphate, ethyl tri(chloromethyl) phosphonium dimethyl phosphate, methyl tri(-4-chlorophenyl) phosphonium dimethyl phosphate, ethyl tri(2-methylphenyl) phosphonium diethyl phosphate, methyl tri(2,4-dimethylphenyl)phosphonium dimethyl phosphate, methyl tri(1-naphthyl) phosphonium dimethyl phosphate, methyl tri(4-butylphenyl) phosphonium dimethyl phosphate, methyl trivinyl phosphonium dimethyl phosphate, methyl triallyl phosphonium dimethyl phosphate, ethyl triallyl phosphonium diethyl phosphate, methyl dimethallyl phenyl phosphonium dimethyl phosphate, methyl tribenzyl phosphonium dimethyl phosphate, methyltributyl phosphonium methyl propyl phosphate, ethyl trioctyl phosphonium dipropyl phosphate, tetraethyl phosphonium dibutyl phosphate, methyl triphenyl phosphonium dimethallyl phosphate, ethyl triisooctyl phosphonium ethyl benzyl phosphate, dimethyl dicyclohexyl phosphonium methyl benzyl phosphate, methyl tripropyl phosphonium methyl phenyl phosphate, methyl trilauryl phosphonium diphenyl phosphate, methyl trihexyl phosphonium methyl 2 - chloroethyl phosphate, ethyl triphenyl phosphonium 2-bromoethyl ethyl phosphate, ethyl trioctyl phosphonium propyl phenyl phosphate, methyl tridecyl phosphonium methyl decyl phosphate, methyl triethyl phosphonium dioctadecyl phosphate, ethyl trimethyl phosphonium di(o-tolyl) phosphate, ethyl tributyl phosphonium ethyl 1-naphthyl phosphate, ethyl triheptyl phosphonium ethyl 2-chlorophenyl phosphate, methyl tributyl phosphonium methyl 3-bromophenyl phosphate, methyl trioctyl phosphonium methyl vinyl phosphate, methyl triallyl phosphonium methyl allyl phosphate, ethyl triphenyl phosphonium ethyl crotyl phosphate.

Examples of primary phosphonic acid derivatives which can be made by the present invention include methyltributyl phosphonium methylmethane phosphate, methyltributylphosphonium methyl allyl phosphonate (methyltributylphosphonium methyl 2-propene phosphonate), ethyltributyl phosphonium ethyl chloromethyl phosphonate, methyltrioctyl phosphonium methyl methane phosphonate, methyltriphenylphosphonium methyl methane phosphonate, methyltriphenyl phosphonium methyl methane phosphonate, methyltributyl phosphonium ethyl methane phosphonate, ethyl butyl dibenzyl phosphonium ethyl 2-methylpropene phosphonate, methyltributyl phosphonium phenyl methane phosphonate, ethyltrioctyl phosphonium butyl methane phosphonate, tetramethyl phosphonium methyl ethane phosphonate, tetraethyl phosphonium ethyl ethene phosphonate, methyltrihexyl phosphonium methyl 1-butene phosphonate, methyltributyl phosphonium ethyl hexane phosphonate, ethyltrioctyl phosphonium ethyl octadecane phosphonate, ethyltributyl phosphonium 2-chloroethyl phenylmethane phosphonate, methyl trilauryl phosphonium methyl benzene sulfonate, methyl ethyl dibutyl phosphonium ethyl 4-methylbenzene phosphonate, ethyl tributyl phosphonium ethyl 2-methyl-5-isopropylbenzene phosphonate, methyl triethyl methyl cyclohexanephosphonate, ethyl tributyl phosphonium ethyl iodomethane phosphonate, dimethyl ethyl butyl phosphonium methyl trioctyl phosphonium methyl trichloromethane phosphonate, methyl triamyl phosphonium methyl 2-chloroethane phosphonate, tetraethyl phosphonium ethyl 1,2-dibromoethane phosphonate, ethyl triisobutyl phosphonium ethyl 1 - chloro-3-methylbutane phosphonate, ethyl trioctyl phosphonium ethyl 4-chlorobenzene phosphonate, ethyl triphenyl phosphonium ethyl 2-bromobenzene phosphonate and ethyl trioctyl phosphonium ethyl 2,5-dichlorobenzene phosphonate.

Examples of secondary phosphonic acid derivatives which can be made by the present invention include methyl tributyl phosphonium dimethyl phosphonate, ethyl trioctyl phosphonium dimethyl phosphate, methyl trihexyl phosphonium dipropyl phosphonate, methyl tributyl phosphonium methyl ethyl phosphonate, methyl triphenyl phosphonium dibenzyl phosphonate, ethyl tricyclohexyl phosphonium phenyl methyl phosphonate and ethyl tributyl phosphonium diphenyl phosphonate.

All of the quaternary phosphonium compounds prepared according to the present invention are useful as flame proofing agents for cellulose, as welting agents, as fungicides, e.g. against *Rhizoctonia solani*, Pythium spp., Fusarium and Verticillium, e.g. at a rate of 1000 pprm. and as bactericides.

Unless otherwise indicated all parts and percentages are by weight.

EXAMPLE 1

Compound: Methyltributylphosphonium dimethylphosphate

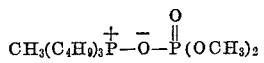

Trimethylphosphate (0.22 M.) was added to 0.20 M of tributylphosphine in 100 gms. of isopropanol under an inert nitrogen atmosphere. The solution was warmed to 90° C. at which point a mildly exothermic reaction occurred, lasting for about 5 minutes. The solution was refluxed for 4 hours and then tested for unreacted phosphine with a 0.1 N solution of iodine in benzene. Essentially all of the phosphine was reacted. The excess trimethylphosphate was removed by distillation at reduced pressure (170° C./10 mm. Hg) leaving 68 gms. (99.5%) of methyltributylphosphonium dimethyl phosphate as a colorless oil that was completely soluble in water, $n_D^{25}$ 1.4686.

EXAMPLE 2

Compound: Methyltrioctylphosphonium dimethylphosphate

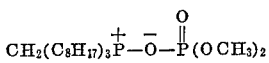

Trimethylphosphate (5.0 M) was added to 4.05 M of trioctylphosphine under a nitrogen atmosphere over a one hour period of 130° C. A mild exothermic reaction occurred during the addition. The solution was heated at 120–130° C. for 6 hours and then tested for unreacted phosphine with an iodine solution in benzene. Essentially all of the phosphine was reacted. Excess trimethylphosphate was removed by heating to 150° C. at 2 mm. Hg yielding 2040 gms. (98.6%) of methyltrioctylphosphonium dimethylphosphate as an amber oil, $n_D^{25}$ 1.4633.

EXAMPLE 3

Compound: Methyltributylphosphonium methylmethanephosphonate

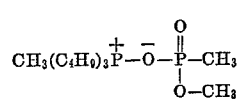

To 1.23 M of tributylphosphine in 150 gms. of butanol there was added 1.4 M of dimethylmethanephosphonate and the solution was refluxed for 13 hours under nitrogen. At this point the reaction was essentially complete. Vacuum stripping up to 150° C./0.5 mm. gave 384 gms. (95.6%) of methyltributylphosphonium methylmethanephosphonate as a colorless oil. This compound was soluble in water and in toluene and had an $n_D^{25}$ 1.4728.

EXAMPLE 4

Compound: Methyltributylphosphonium methylallylphosphonate

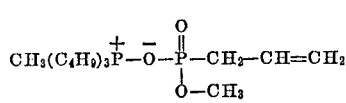

This compound was made by the method of Example 3 from 1.23 mole of tributylphosphine and 1.4 mole of dimethylallylphosphonate, $n_D^{25}$ 1.4790.

Yield—96.3%

Appearance—colorless oil

EXAMPLE 5

Compound: Ethyltributylphosphonium ethylchloromethylphosphonate

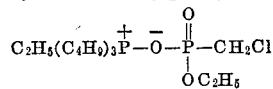

The compound was prepared by the method of Example 3 from 1.23 mole of tributylphosphine and 1.4 mole of diethyl chloromethylphosphonate.

Yield—98%

Appearance—colorless oil, $n_D^{25}$ 1.4850

The compound was soluble in water, methanol and benzene.

EXAMPLE 6

Compound: Methyltriphenylphosphonium dimethylphosphate

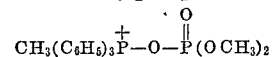

A mixture of .25 M of triphenylphosphine and .40 M of trimethylphosphate was heated under nitrogen for 16 hours at 130° C., then for 1 hour at 190° C. The reaction mixture was stripped up to 160° C. at 0.5 mm. Hg, leaving 101 gms. (100%) of methyltriphenylphosphonium dimethyl phosphate as a yellow oil that set to a glass at 25° C., density at 25° C. 1.271. It was completely soluble in water.

EXAMPLE 7

Ethyl butyl dibenzyl phosphonium diethyl phosphate is made by the method of Example 3 from 1.23 mole of dibenzyl butyl phosphine and 1.4 mole of triethyl phosphate.

What is claimed is:

1. A compound having the formula

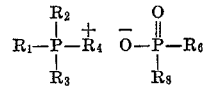

where $R_4$ is methyl or ethyl, $R_6$ is $R_8$ or $OR_7$, $R_1$, $R_2$ and $R_3$ are alkyl of 1 to 18 carbon atoms, chloromethyl, alkenyl of 2 to 4 carbon atoms, benzyl, phenyl, alkyl phenyl having 1 to 4 carbon atoms in the alkyl groups, naphthyl, bromophenyl or chlorophenyl, $R_7$ and $R_8$ are alkyl of 1 to 18 carbon atoms, haloalkyl of 1 to 5 carbon atoms, alkenyl of 2 to 4 carbon atoms, benzyl, phenyl, naphthyl, alkylphenyl having 1 to 3 carbon atoms in the alkyl groups, chlorophenyl and bromophenyl.

2. A compound having the formula

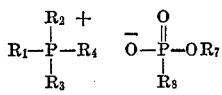

where $R_4$ is methyl or ethyl, $R_1$, $R_2$ and $R_3$ are alkyl of 1 to 18 carbon atoms, chloromethyl, alkenyl of 2 to 4 carbon atoms, benzyl, phenyl, alkyl phenyl having 1 to 4 carbon atoms in the alkyl groups, naphthyl, bromophenyl or chlorophenyl, $R_7$ and $R_8$ are alkyl of 1 to 18 carbon atoms, haloalkyl of 1 to 5 carbon atoms, alkenyl of 2 to 4 carbon atoms, benzyl, phenyl, naphthyl, alkylphenyl having 1 to 3 carbon atoms in the alkyl groups, chlorophenyl and bromophenyl.

References Cited

FOREIGN PATENTS 201,401   9/1967   Russia _____ 260—926

JOSEPH REBOLD, Primary Examiner

A. H. SUTTO, Assistant Examiner

U.S. Cl. X.R.

117—143 R; 252—DIG 17; 260—606.5 P, 961, 968; 424—204